(No Model.)
G. W. LAMB.
APPARATUS FOR HOISTING BALES ON WAGONS.
No. 317,803. Patented May 12, 1885.
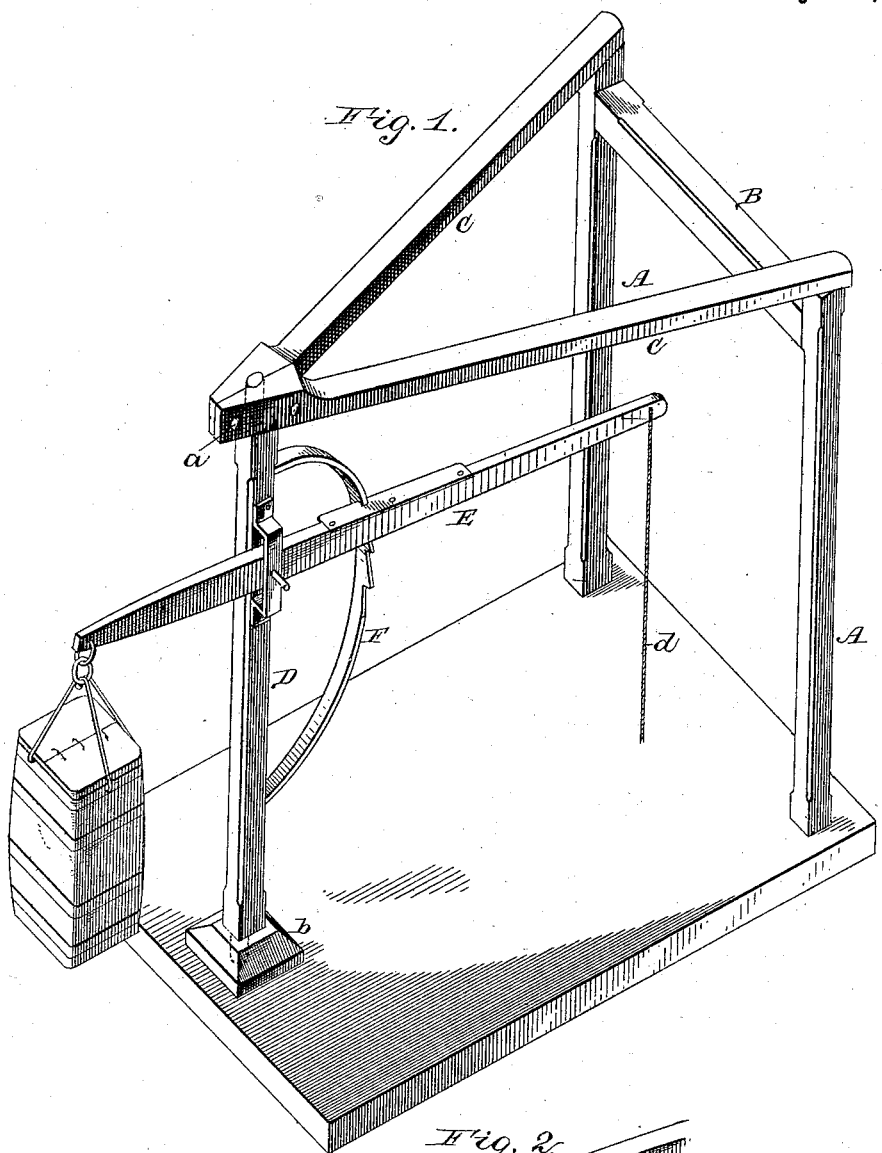
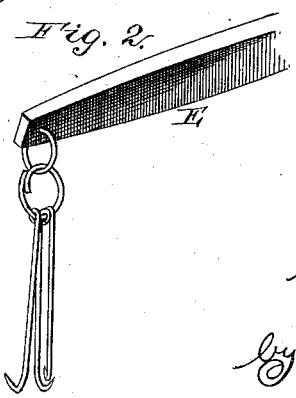
WITNESSES
J. W. Garner
E. G. Siggers
Geo. W. Lamb
INVENTOR
by C. A. Snow & Co
Attorneys.

United States Patent Office.

GEORGE WASHINGTON LAMB, OF BOWIE, TEXAS.

APPARATUS FOR HOISTING BALES ON WAGONS.

SPECIFICATION forming part of Letters Patent No. 317,803, dated May 12, 1885.

Application filed December 23, 1884. (No model.)

*To all whom it may concern:*

Be it known that I, GEORGE W. LAMB, a citizen of the United States, residing at Bowie, in the county of Montague and State of Texas, have invented a new and useful Improvement in Apparatus for Hoisting Bales on Wagons, of which the following is a specification, reference being had to the accompanying drawings.

My invention relates to apparatus for loading and unloading wagons, and it has for its object to provide an apparatus of this character which shall be cheap and simple in its construction, effective in its operation, strong and durable, an apparatus by the use of which a wagon may be quickly loaded or unloaded.

With these ends in view the invention consists in the improved construction and combinations of parts hereinafter fully described, and pointed out in the claims.

In the drawings, Figure 1 is a perspective view of a loading apparatus constructed in accordance with my invention, and Fig. 2 is a detail view of a portion of the arm E.

A A represent suitable uprights or supporting-standards, arranged a suitable distance apart, and braced and connected near their upper ends by a cross or tie beam, B.

C C represent beams secured to the upper ends of the uprights or supporting-standards A A, said beams converging and being secured together at their outer ends by a bolt, $a$, or in any other suitable manner.

D represents a beam, the upper end of which is reduced and is mounted in a hole or opening formed in the meeting ends of the beams C C. The lower end of said beam D is also reduced, and is located in a hole or opening formed in a base-block, $b$. It will thus be seen that said beam may be turned in either direction, and that it serves to support the outer ends of the beams C C.

Upon the side of the beam D is provided a bracket, and upon a bolt having bearing in the bracket at one end, and in the beam D at its other end is an arm or lever, E, which is fulcrumed near its outer end.

Upon the outer end of the lever E are provided a series of hooks which are pivoted thereto, said hooks being adapted to grapple the object to be raised. It will be observed that by pivoting the beam D, the said beam and the arm or lever may be turned to be operated from any point.

Upon one side of the beam D is provided a rack-plate, F, the teeth of which are adapted to be engaged by a plate secured upon the upper side of the lever D, and projecting beyond the inner edge or face of the same.

Attached to the rear end of the arm or lever E is a cord or rope, $d$, whereby said arm or lever may be raised or lowered, as is desired.

The operation is as follows: The arm or lever is lowered and the hooks thereon engaged with the object to be raised. The rear end of the arm or lever is lowered, thus raising said object. The plate upon the upper side of the lever E is pushed into engagement with one of the teeth of the rack-plate, thus holding the object in a raised position.

The above-described apparatus is especially applicable to loading and unloading bales of cotton from wagons, &c., though I do not wish to limit myself to its use.

The above-described apparatus is cheap and simple in its construction, effective in its operation, and strong and durable, and by its use weighty objects may be readily raised to or lowered from a wagon.

It will be observed that the journaling of the beam D enables the lever E to be swung around almost in a complete circle from one standard A to the other, and thus avoid the necessity of moving the frame, since the hooks on the end of said lever may grapple the bale on one side, and then by turning the lever in a horizontal line carry the bale around to the opposite side of the frame. In this way the operator has complete command over the hoisting apparatus, the lever having both a vertical and a horizontal plane of movement to accommodate the apparatus to the various circumstances. As shown in Fig. 2, the number of hooks on the end of the lever may be increased or diminished at will to correspond with the size of the object to be raised. For this purpose I provide an open ring formed of spring metal, the ends of the ring overlapping each other, so that the eyes of the hooks may be slipped over one of the ends of the ring, the latter assuming its normal position as soon as the hooks are in place.

Having fully described my invention, what I claim as new, and desire to secure by Letters Patent, is—

1. As an improvement in hoisting apparatus, the combination, with the frame, of the vertical beam D, journaled in the frame, and the hoisting-lever pivoted to the said beam and carrying a grappling device at one end arranged and operating whereby said lever is given both a horizontal and a vertical movement, as and for the purpose set forth.

2. The combination, with a suitable frame, of the vertical beam D, journaled in the frame, the hoisting-lever E, pivoted to the beam, and carrying a grappling device at its outer end, and means, substantially as described, for holding the lever at any point of its vertical movement, the said lever having also a horizontal line of movement, as and for the purpose set forth.

3. As an improvement in hoisting apparatus, the combination, with the frame comprising the base, the standards or uprights A, and the converging beams C, connected together at their outer ends, and fitted at their inner ends to the standards or uprights A, of the vertical beam D, journaled at its upper end in the beams C, and at its lower end in the base, and the pivoted lever E, attached to the beam D and carrying a grappling device at its outer end, arranged and operating whereby said lever will have a complete horizontal line of movement from one side of the frame to the other, as set forth.

In testimony that I claim the foregoing as my own I have hereto affixed my signature in presence of two witnesses.

GEORGE WASHINGTON LAMB.

Witnesses:
J. I. G. COWAN,
R. A. BROWN.